Patented Aug. 10, 1948

2,446,806

UNITED STATES PATENT OFFICE 2,446,806

PRODUCTION OF SUBSTITUTE LEATHER

André Bernard, Paris, France

No Drawing. Application August 29, 1945, Serial No. 613,446. In France June 12, 1941

Section 1, Public Law 690, August 8, 1946
Patent expires June 12, 1961

1 Claim. (Cl. 117—161)

It has already been proposed to produce a substitute leather by applying a coating of suitable composition on to a support such as a cotton or the like tissue.

For such a coating, different solutions have already been used and in particular:

A solution of cellulosic esters such as nitrocelluloses plastified by means of suitable substances, for instance castor oil or tricresylphosphate, and admixed with organic or mineral pigments for instance lamp black or ultramarine.

Rubber solutions admixed with fillers for instance koalin and different protecting and vulcanizing products, for instance products containing sulphur and zinc oxide.

But it is necessary in this case to use expensive organic solvents such as benzol which it is necessary to recover afterwards, which leads to large-sized plants. Moreover such solvents may be a cause of fire and of intoxication for the workmen who are to handle them.

In the preparation of the coating, latex emulsions admixed with suitable fillers have also been used. But the coatings thus obtained have the defect of adhering insufficiently to their carrier in spite of the addition of so-called wetting products such as the sulphonates of higher fatty alcohols and in particular the sulphonates of lauric alcohol.

These various known methods show moreover the drawback of producing a substitute leather adapted to alter under the action of outer influences such as that of air, light, heat or bad weather, so that the surface of the product looses very rapidly its yieldingness and its strength.

My present invention has for its object a method which avoids the different defects of the methods known in use.

According to this invention, I use for the formation of the coating to be applied on to its carrier, a compound aqueous emulsion of a polyvinyl resin and of an anthracene oil.

Before it is mixed with the anthracenic oil, the polyvinyl resin may be admixed with one or more well known plasticizers such as tricresylphosphate or a phthalate which may be butyl, methyl, or any other phthalate.

As a polyvinyl resin, I may use either a polyvinyl halide such as polyvinyl chloride or else a polyvinyl ester of a fatty acid such as polyvinyl acetate or a mixture of products of these two types.

If for instance I prepare an emulsion of one of these substances, with the use as an emulsifier of soda, sulphoricinate, gelatine or casein, and if I add to the emulsion formed anthracene oil, it is found that this oil is perfectly emulsified after a suitable stirring and this leads to the obtention of a generally stable compound emulsion of polyvinyl resin and anthracene oil.

In the case however where the anthracenic oil admixed with the emulsion of polyvinyl resin does not form therewith a perfect emulsion, it is possible either to form a separate emulsion of the oil preferably with the use of soda sulphoricinate or else to add to the polyvinyl resin before or after the addition of anthracene oil a complementary amount of soda sulphoricinate or the like emulsifying agent.

The compound emulsion prepared may also be admixed with fillers or mineral or organic pigments such as kaolin, talc, zinc white, titanium oxide, lampblack, chrome yellow, etc.

This emulsion may then be applied to one side or to both sides of the carrier fabric through any suitable means. It is possible for instance to project the emulsion on to the fabric by using an atomizing gun operating with compressed air or else to spread the emulsion by means of a scraper on to the well stretched tissue.

Once the fabric is suitably coated, it is submitted to a drying by placing it for instance inside a kiln heated at a temperature of about 50 to 80° C.

After drying, the coating shows a perfectly smooth surface and adheres strongly to the threads of the tissue through its comparatively deep penetration inside same whereby it closes the insterstices of the tissue.

In order to improve the state of the surface of the product, I may proceed with a plurality of successive coating operations. The coatings thus applied may have different compositions and it may in particular be of advantage to increase the proportion of anthracenic oil and consequently the yieldingness from the first coating to the last.

In order to imitate the appearance of leather, I may make the product pass either when cold or when hot between two cylinders of which one shows a rough surface so as to produce the desired grain.

The final product may replace leather in a large number of applications and in particular for the obtention of Morocco-leather objects, bindings, lashes, etc.

What I claim is:

A method for producing a substitute leather consisting in applying on to a fabric carrier, a coating constituted by a compound emulsion obtained by the addition to an aqueous emulsion of polyvinyl resin selected from the group consisting of polyvinyl halides, polyvinyl esters and mixtures thereof, of an aqueous emulsion of anthracene oil.

ANDRÉ BERNARD.

REFERENCES CITED

The following references are of record in the file of this patent:

Neville Plasticizing Oils—published by the Neville Co., Pittsburgh, Pa. (1941). Pages 6 to 14.

Jackson—British Plastics, Mar. 1943, pages 577 to 582.